United States Patent
Ström et al.

(10) Patent No.: US 6,985,862 B2
(45) Date of Patent: Jan. 10, 2006

(54) HISTOGRAM GRAMMAR WEIGHTING AND ERROR CORRECTIVE TRAINING OF GRAMMAR WEIGHTS

(75) Inventors: Nikko Ström, Mountain View, CA (US); Nicholas Kibre, Mountain View, CA (US)

(73) Assignee: Tellme Networks, Inc., Mountain View, CA (US)

( * ) Notice: Subject to any disclaimer, the term of this patent is extended or adjusted under 35 U.S.C. 154(b) by 926 days.

(21) Appl. No.: 09/816,743

(22) Filed: Mar. 22, 2001

(65) Prior Publication Data

US 2003/0004717 A1    Jan. 2, 2003

(51) Int. Cl.
*G01L 15/00* (2006.01)

(52) U.S. Cl. .................. 704/255; 704/257
(58) Field of Classification Search ............ 704/255, 704/257
See application file for complete search history.

(56) References Cited

U.S. PATENT DOCUMENTS 5,774,859 A * 6/1998 Houser et al. ............. 704/275
5,995,918 A * 11/1999 Kendall et al. ............... 704/1
6,128,595 A * 10/2000 Ruber ........................ 704/255
6,604,077 B2 * 8/2003 Dragosh et al. ......... 704/270.1

FOREIGN PATENT DOCUMENTS

JP    06-266385    * 9/1994

* cited by examiner

*Primary Examiner*—Daniel Abebe
(74) *Attorney, Agent, or Firm*—Bever, Hoffman & Harms, LLP; John M. Kubodera

(57) ABSTRACT

A multi-level method for estimating and training weights associated with grammar options is presented. The implementation of the method implemented differs depending on the amount of utterance data available for each option to be tuned. A first implementation, modified maximum likelihood estimation (MLE), can be used to estimate weights for a grammar option when few utterances are available for the option. Option weights are then estimated using an obtainable statistic that creates a basis for the predictability model. A second implementation, error corrective training (ECT), can be used to estimate option weight when a sufficiently large number of utterances are available. The ECT method minimizes the errors in the score of the correct interpretation of the utterance and the highest scoring incorrect interpretation in an utterance training set. The ECT method is iterated to converge on a solution for option weights.

44 Claims, 6 Drawing Sheets

HISTOGRAM GRAMMAR WEIGHTING AND ERROR CORRECTIVE TRAINING OF GRAMMAR WEIGHTS

BACKGROUND OF THE INVENTION

1. Field of the Invention

The present invention relates to speech recognition, and specifically to methods for assigning and training grammar weights for a speech recognition system.

2. Discussion of the Related Art

Automatic speech recognition (ASR) systems translate audio information into text information. Specifically, an utterance (i.e. audio information) made by a user is input to the ASR system. The ASR system interprets the utterance based on a score describing a phonetic similarity to the natural language options in a set of active grammars. An active grammar is an available set of natural language options (options) in a particular context. The different ways an option might be spoken are defined as option variants. For example, in the context of movies, an active grammar can represent the names of presently playing movies. Each option in the movie grammar is a tag corresponding to a movie name. For each option (e.g. the tag for the movie name "Mission Impossible: 2"), the grammar might include option variants for recognizing "mission impossible", "mission_impossible" (run-on of the two words), and "mission impossible two". These option variants represent the different ways a user might say the name of the movie "Mission Impossible: 2". Thus, each of these option variants corresponds to a single natural language option, the tag corresponding to the movie "Mission Impossible: 2". As a result, when an utterance is recognized as the option variant "mission impossible", then the ASR system returns the option for "Mission Impossible: 2" as the natural language interpretation of the utterance.

The ASR system computes scores for the options of the active grammars for each utterance. The score of an option is based on two kinds of information: acoustic information and grammatical information. A probabilistic framework for the acoustic information defines the "acoustic score" as the likelihood that a particular option was spoken, given the acoustic properties of an utterance. The grammatical information biases some options in relation to others. In a probabilistic framework, the grammatical information is defined as a probability associated with each option. These probabilities are referred to herein as "grammar weights", or simply "weights". The score computed by the ASR system for an option, given an utterance, is a combination of the acoustic score and the grammar weight. In a probabilistic framework, the logarithm of both the grammar weight and the acoustic score are added. While scores discussed herein relate to a probabilistic framework with all scores defined in the logarithmic domain, the concepts described herein can be applied to other ways of merging the acoustic information with the grammatical information as well.

The ASR system chooses the active grammar option having the highest score as the natural language interpretation of the utterance (i.e. recognized result). Increasing the grammar weight of an option (and thus increasing the score of the option) therefore increases the chance of that option being chosen as the natural language interpretation of a given utterance by the ASR system.

In voice applications, an application author defines the active grammars for each portion of the application. An application author is a voice application programmer, and typically has no training as a speech scientist. Grammar weights of variants are defined by application authors in the course of the application programming process and are therefore alterable by the application author. However, because acoustic scores are modeled by the manufacturer of the speech recognizer (the recognition engine of the ASR system), the acoustic scores are typically fixed in a particular version of a speech recognizer.

The grammar weights of options in active grammars may be determined (either assigned or tuned) according to a specific method to maximize the abilities of the ASR system to correctly interpret utterances. It is often impractical to obtain enough utterance data to assign grammar weights directly from utterance frequency. Additionally, directly weighting from utterance frequency only indirectly minimizes the number of recognition results. One current method for determining grammar weights of options requires a highly trained speech scientist to review error and utterance frequency data for an ASR system and to alter grammar weights of options based on this review. Ideally, grammar weights of options are derived from large amounts of data to make them as accurate as possible. Moreover, even relatively simple or small grammars having few options typically have many variants of each option. Therefore, this review process is an enormous task for one person. To further complicate this process, there are a limited number of speech scientists in the industry, thereby significantly increasing the cost of the review. Finally, relying on a subjective, human review introduces the possibility of error, and at the very least, inconsistent analysis based on different interpretations of the data.

Therefore, a need arises for a method of, and a system for, efficiently determining the grammar weights of options in grammars for an ASR system.

SUMMARY OF THE INVENTION

In accordance with the present invention, a method for determining grammar weights associated with grammar natural language options (options) is presented. User utterances related to the grammar are used in this determination (either estimation or training). The portion of the method implemented differs depending on the number of utterances available for each grammar.

A first portion of the method, modified maximum likelihood estimation (MLE), can be used to estimate grammar weights of options when utterance data is sparse relative to the complexity of a grammar (i.e. when many grammar options have few or no utterances for which they are the recognized result). The recognized result is the option chosen by the ASR system as the natural language interpretation of the utterance. An attribute of the options (an easily obtainable statistic) is found to create a basis for a predictability model. This attribute should roughly correspond to the (expected) utterance frequency. Options are then separated into groups according to this attribute and an average group probability assigned based on the actual utterance frequency of the group.

In one embodiment, each option in a group is assigned the same initial MLE estimated weight based on the average probability of options in the group. In another embodiment, the initial MLE estimated weight of each option in the group is determined using a linear interpolation between the average probability of the group containing the option and the average probability of the next closest group of options.

Some of the options, called outliers, that are predicted according to this MLE method may have a minimum number of associated utterances and an actual utterance frequency greater than a few multiples of the initial MLE estimated weight. The utterance frequency of an option is the number of utterances that have a transcribed result matching that option divided by the total number of utterances in the utterance training set. A transcribed result is a human interpretation of the utterance. The utterance training set is the set of utterances used to assign or tune grammar weights. Grammar weights of these outliers are altered to replace the initial MLE estimated weight with a weight based on the actual utterance frequency.

A second portion of the method, error corrective training (ECT), can be used to tune grammar weights of options when a sufficiently large number of utterances are available. The ECT method minimizes the errors in an utterance training set. Errors are determined by comparing the score of the transcribed result to the score of the largest scoring option that is not the transcribed result (the best competitor). The weights of the transcribed result and the best competitor are altered based on this score comparison. Because the utterance training set is iterated through the ECT method to converge on a solution for grammar weights of options with each iteration adjusting weights of options to compensate for errors, the weights of the options are determined by minimizing the errors in the utterance training set.

BRIEF DESCRIPTION OF THE DRAWINGS

Similar elements in the above Figures are labeled similarly.

DETAILED DESCRIPTION OF THE DRAWINGS

Figure 1:
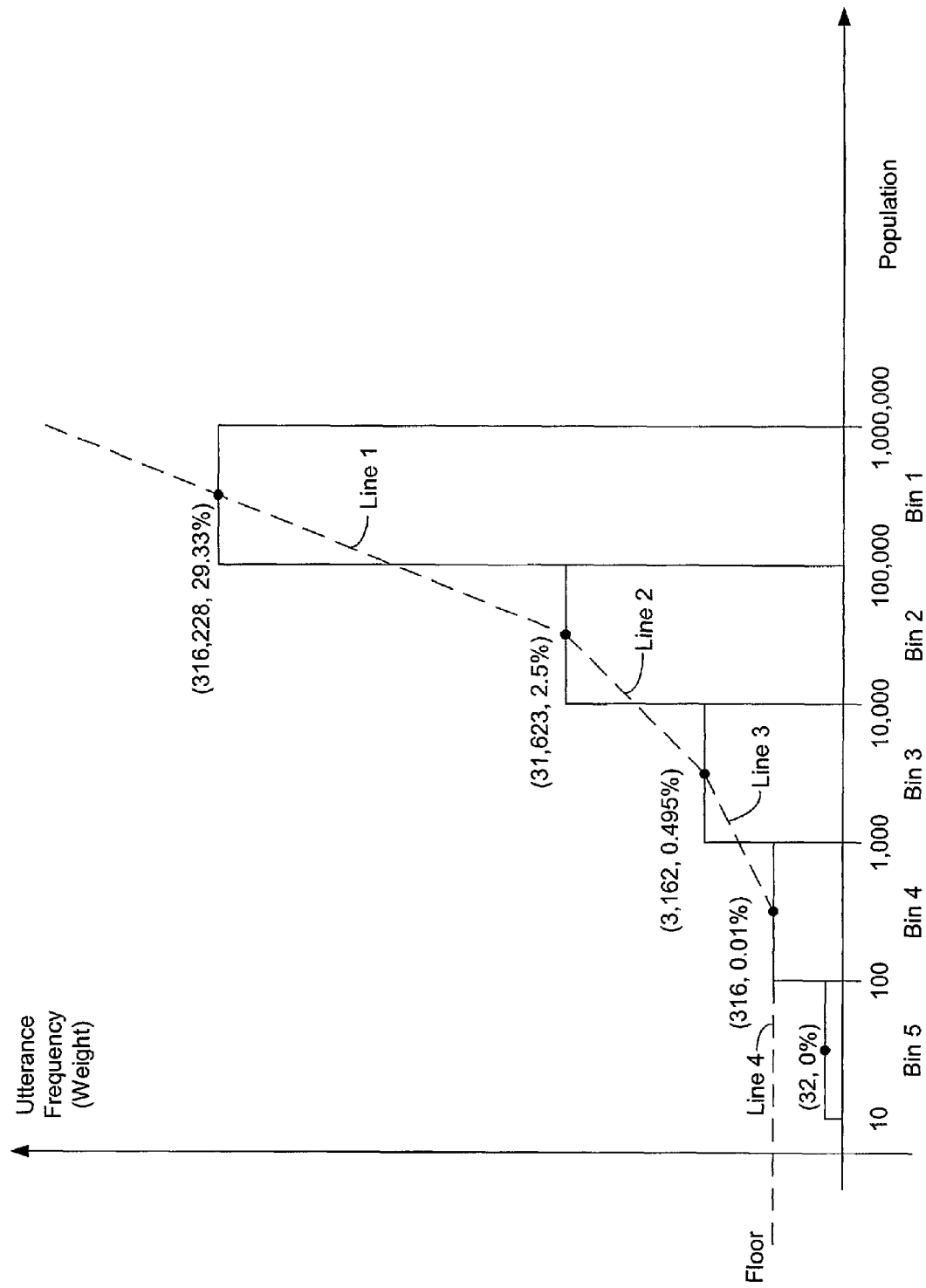
FIG. 1 is a graph of utterance frequency versus population in accordance with one embodiment of the present invention.

A method for determining grammar weights associated with natural language options (options) is presented. Voice applications using an automatic speech recognition (ASR) system to translate user utterances into text constrain the context of the ASR system to a limited number of options in one or more grammars. Increasing the grammar weight of an option increases the probability that the option will be chosen by the ASR system as a translation, or natural language interpretation, of a given utterance. Thus, the weights associated with options should be properly assigned to correctly balance across the active options the probability that a particular option will be recognized for a given utterance.

Grammar weights for options may be assigned based on an attribute or statistic associated with the options that is expected to be a reasonable predictor of utterance frequency. If a sufficient number of utterances are available for each option, grammar weights of options may also be tuned based on the recognition errors in the ASR system.

In an example using an utterance training set culled from a city/state grammar for the United States of America (wherein the grammar includes as options city and state pairs for most of the United States), the population of each city is one attribute that may be used to estimate the weight to be assigned that city/state pair (i.e. option). Population is deemed a reasonable predictor of utterance frequency because a more populous city is assumed to have more associated utterances in the training set than a less populous city. Other examples of statistics or attributes that could be used are the number of customers in a region (on the assumption that customers tend to ask for information about cities and states that they live in), the box office ticket sales of a movie (for a movie grammar), Neilson or similar ratings for television program (for a TV listing or similar application), number of cars sold (for a automobile make/model grammar), etc.

Modified maximum likelihood estimation (MLE) can be used to estimate grammar weights of options when few utterances are available for an option. Once the attribute of the options (an obtainable statistic) is chosen to create a basis for a predictability model, options (e.g. city/state pairs) are separated into groups according to this attribute and the initial MLE grammar weight of each option determined based on a probability estimate of the group.

Note that exact population figures need not be used even for the city/state example. For example, populations in the United States are heavily clustered in Metropolitan Statistical Areas (MSA), as defined by the United States census. For example, "Yardley, Pa." is within the Philadelphia, MSA. Thus, although Yardley, Pa. itself has a small population (approx. 50,000 in 1990) it is part of one of the densest population regions in the United States (Philadelphia, Pa.). Accordingly, statistics other than actual population might be used, for example, each city/state pair might be assigned the population of the encompassing MSA, or have the associated grammar weight up weighted based on the encompassing MSA.

Specifically in the city/state pair example, the city/state pairs are separated into population groups (bins), for example, a first group of city/state pairs having population greater than 1,000,000, a second group of city/state pairs having population between 100,000 and 999,999, etc. Note that these bins are assigned according to the log of the population, so that each bin is separated by an order of magnitude. A probability is assigned to each group based on the number of utterances attributable to city/state pairs within that group. Thus, if four cities in the second group have 5,000 total associated utterances out of 50,000 utterances in the utterance training set, then the probability that an utterance will be located in the second group is 10%. This is called the utterance frequency of the group. The weight for each city/state pair is then estimated based on population and the utterance frequency of each group.

In one embodiment, each option in a group is assigned the same initial MLE weight based on the average probability of options in the group. Thus, four cities in a group with a 10% group probability will average to a 2.5% probability of an utterance being associated with one of those four cities. In other words, the average utterance frequency of a city within that group is 2.5%. In another embodiment, the initial MLE weight each option in a group is estimated according to a linear interpolation between the average probability of the option in the group containing the option and the average probability of options in the next closest group. For example, within one group, city/state pairs having a lower population will have a smaller initial MLE weight assigned than city/state pairs having a higher population.

Some city/state pairs may have an unexpected number of associated utterances. For example, the ASR system may be heavily advertised in those regions, thereby increasing the number of users interacting with the ASR system in the corresponding city/state pairs. As a result, the number of utterances in the training set associated with those cities may be increased. Options having an unexpected number of associated utterances, called outliers, may have at least a minimum number of associated utterances and an actual utterance frequency greater than a few multiples of the initial MLE weight. The utterance frequency of an option is the number of utterances having that option as a transcribed result divided by the total number of utterances in the utterance training set. Grammar weights of these outliers are altered to replace the initial MLE weight with the actual utterance frequency. For example, if the minimum number of associated utterances is 80 and the multiple of the initial MLE estimated weight is 3, then an option having at least 100 associated utterances and an actual utterance probability greater than three times the initial MLE weight can have the initial MLE weight replaced with the actual utterance frequency.

This process of MLE may be automated. As a result, anyone capable of using the user interface of the present method (e.g. a web and/or command line front end and access to the grammar file and a set of corresponding transcribed utterances for the grammar) may effectively estimate grammar weights without the need for training as a speech scientist. In this way, the need for costly experts who may generate inconsistent results is reduced. Additionally, or alternatively, the approaches described herein can be used in conjunction with speech scientists to provide a starting point for further adjustment, as a comparison against which to measure the performance of the expert-created grammar, and/or in other fashions. For example, in one embodiment, these approaches are made available for free (or at low cost) to customers of a voice application provider while access to and time spent with a speech expert to tune a grammar requires separate (or more expensive) payments.

Error corrective training (ECT) can be used to tune grammar weights of options when a sufficiently large number of utterances are available. The "training" process is an iterative adjustment of grammar weights of options to achieve minimization of errors. For example, a large number of utterances may be associated with city/state pairs having large populations. In addition to MLE described above, city/state pairs having a large number of associated utterances may be alternately assigned weights (or the weights assigned according to modified MLE tuned) based on ECT. Options in the active grammar that are not to be tuned, either because of insufficient number of associated utterances or for other reasons, are said to be in the background during the tuning process. Thus, the options to be tuned are said to be in the foreground. Foreground options may be in one or several grammars and may encompass a single grammar.

The ECT method minimizes the errors occurring in an utterance training set. Utterances, which are previously recorded audio files, are applied to the ASR system one or more times. These utterances have been recorded during user interaction with the ASR system such as while using a voice application. In response, the ASR system generates an "n-best" list of possible translations of the utterance, wherein each option in the active grammars is ranked according to a score. The resulting scores are used to adjust the grammar weights through comparison with a transcribed human interpretation of the utterance, called the transcribed result. The process is iterated until the adjusted grammar (i.e. the grammar with the most recently changed weights) minimizes some condition (e.g. an error estimation function). For example, in one embodiment, the ASR system chooses the highest scoring option from the n-best list as the natural language interpretation (translation) of the utterance (i.e. the recognized result).

Errors are determined by comparing the score of the transcribed result of the utterance to the highest scoring option that is not the transcribed result (the best competitor). Note that the best competitor may be either in the foreground or in the background. The foreground is the set of options being trained, whereas the background is the set of options active for the ASR system during the utterance that are not being trained. If no error has occurred, then the transcribed result should be the highest scoring option. However, if the best competitor has a higher score than the transcribed result, then the ASR system has erroneously translated the utterance. Out-of-grammar utterances require special attention. If the transcription of an utterance is not an option in any active grammar, then the correct action by the ASR system is to reject the utterance. If rejection is explicitly modeled, then this is treated as a special "reject option". Thus, if the highest scoring option maps to the reject option for an out-of-grammar utterance, no error has occurred. If rejection is not explicitly modeled, out-of-grammar utterances always cause an error, and are therefore ignored for training purposes.

The weights of the transcribed result and the best competitor (if in the foreground) are altered for each utterance. The weight of the transcribed result is increased by a first amount to increase the likelihood that the ASR system chooses that option when translating the associated utterance. The weight of the best competitor is decreased by a second amount to decrease the likelihood that the ASR system chooses that option when translating the associated utterance.

Once each utterance has been applied a first time to the ASR system, the first iteration of ECT is complete. Each utterance in the utterance training set is then applied again to the ASR system to further correct errors which may have been introduced in the first iteration or which remain in spite of the first iteration of tuning option weights. Note that because the weights of the foreground options have changed, the scores in the n-best list generated by the ASR system have also changed. Thus, the result recognized by the ASR system may be different for a given utterance in the second iteration than in the first iteration. In this way, as ECT converges on a solution for grammar weights of options, the errors in the utterance training set are minimized. Modified MLE and ECT are described in more detail below.

Modified Maximum Likelihood Estimation (MLE)

Some grammars contain a large number of options. The utterances associated with these grammars or with a set of options in these grammars may be too sparse to directly assign weights to options from utterance frequency. Grammar options having any number of associated utterances may be assigned weights according to the modified MLE of the present invention. However, modified MLE is typically used to estimate the weights of options when few utterances are associated with the options and those options have an associated easily obtainable statistic that roughly corresponds to the utterance frequency. Note that some options, i.e. outliers, may be expected to have significantly higher frequency than predicted by this method. The weights of these outliers are adjusted to match their utterance frequency.

For example, Table 1 shows a table of Cities A–N to be weighted according one embodiment of the present invention. Each of Cities A–N is an option in the city/state grammar of Table 1. Assume that all cities are in State Z, which is reflected in the utterance set. Thus, the utterances corresponding to City A will be of the form "City A, Z" (e.g. San Jose, Calif.).

TABLE 1

| City | Population | Bin | Number of Utterances | Total Bin Utterances | Utterance Likelihood for Bin | Utterance Likelihood Per City |
|------|-----------|-----|---------------------|---------------------|------------------------------|-------------------------------|
| City A | 900,000 | 1 | 18,000 | 44,000 | 88% | 29.33% |
| City B | 700,000 | 1 | 16,000 | | | |
| City C | 170,000 | 1 | 10,000 | | | |
| City D | 70,000 | 2 | 1,750 | 5,000 | 10% | 2.5% |
| City E | 60,000 | 2 | 1,750 | | | |
| City F | 60,000 | 2 | 1,000 | | | |
| City G | 20,000 | 2 | 500 | | | |
| City H | 8,000 | 3 | 125 | 990 | 1.98% | 0.495% |
| City I | 6,000 | 3 | 640 | | | |
| City J | 4,000 | 3 | 125 | | | |
| City K | 1,200 | 3 | 100 | | | |
| City L | 500 | 4 | 2 | 10 | 0.02% | 0.01% |
| City M | 300 | 4 | 8 | | | |
| City N | 80 | 5 | 0 | 0 | 0% | 0% |

The population of each city is an easily obtainable statistic that roughly corresponds with the utterance frequency. That is, a more populous city is more likely to have a larger number of corresponding utterances than a less populous city, as shown in the "Population" and "Number of Utterances" columns of Table 1. Additionally, cities having fewer associated utterances are typically cities with smaller populations, as shown in the "Number of Utterances" column in Table 1 for Cities L–N. Thus, modified MLE is used to determine weights for the cities in Table 1.

Cities are separated into groups (bins) according to population on a logarithmic scale. Thus, cities having population greater than or equal to 100,000 (Cities A–C) are grouped in to a first bin (Bin 1). Cities having a population greater than or equal to 10,000 but less than 100,000 (Cities D–G) are grouped into a second bin (Bin 2). In the same manner, Cities H–K are grouped into a third bin (Bin 3), Cities L and M are grouped into a fourth bin (Bin 4), and City N is grouped into a fifth bin (Bin 5).

Each of Bins 1–5 is assigned a probability according to utterance frequency for that bin. The number of utterances for a bin ("Total Bin Utterances" column in Table 1) is determined by adding together the number of utterances for each city in the bin ("Number of Utterances" column in Table 1). For example, the number of utterances for Bin 1 is the sum of utterances corresponding to Cities A–C, or 18,000+16,000+10,000, which equals 44,000.

To determine the utterance frequency for a bin ("Utterance Likelihood for bin" column in Table 1), the total number of utterances of cities in that bin ("Total Bin Utterances" column in Table 1) is divided by the total number of utterances ("Number of Utterances" column in Table 1 totaled). For example, utterance frequency for Bin 1 is 44,000 utterances divided by the total number of utterances (44,000+5,000 +990+10 totals 50,000), which equals 88%. This number is shown in the "Utterance Likelihood for bin" column (see Table 1) associated with Bin 1. Thus, 88% of the utterances in the utterance training set are associated with cities in Bin 1. The average likelihood that an utterance corresponds to a particular city in a given bin is the utterance likelihood for the bin divided by the number of cities in the bin. For example, the average likelihood that an utterance corresponds to one of Cities A, B, or C is 88% divided by 3 cities, or 29.33%. This number is shown in the "Utterance Likelihood per city" column (see Table 1) associated with the Bin 1 cities. Note that this is different than the actual utterance frequency of each city. The actual utterance frequency of each city is the number of utterances corresponding to a particular city divided by the total number of utterances. For example, the actual utterance frequency of City A is 18,000 utterances divided by 50,000 total utterances, or 36%.

In one embodiment of the present invention, the average likelihood that an utterance corresponds to a city in a bin is assigned as the weight of each city (option) in that bin. For example, Cities A–C are each assigned a weight of 0.2933 (29.33%). In another embodiment of the present invention, the weight assigned to each city is further estimated using the average likelihood per city of the bin containing the city and the average likelihood per city of the next closest bin.

FIG. 1 is a graph of utterance frequency versus log of population for the cities of Table 1 in accordance with one embodiment of the present invention. Bin 1, which includes cities with population greater than or equal to 100,000 (Cities A–C), has a height corresponding to the average utterance likelihood per city in Bin 1, which is equal to 29.33%. Similarly, the heights of Bins 2–5 similarly correspond to the associated numbers in the "Utterance Likelihood Per City" column (see Table 1). Because population has a base-10 logarithmic scale, the midpoint of each bin is the lower boundary of the bin multiplied by 10 to the 0.5 power, or 3.16228. Thus, for example, the midpoint of Bin 2 (10,000 ($=10^4$) through 100,000 ($=10^5$)) is a population of 31,623 ($=10^{4.5}$). In one embodiment, each city/state pair in Table 1 has an initial MLE weight assigned based on the "Utterance Likelihood Per City" (see Table 1).

Lines 1–3 connect the midpoint of each bin to the midpoint of the neighboring bins. Thus, Line 1 connects the midpoint of Bin 2 to the midpoint of Bin 1, continuing along the same slope past the midpoint of Bin 1, Line 2 connects the midpoint of Bin 3 to the midpoint of Bin 2, and Line 3 connects the midpoint of Bin 4 to the midpoint of Bin 3. Line 4 establishes a floor utterance percentage below which weights of options are uniformly assigned to some minimum weight, which is described in more detail below. In another embodiment of the present invention, each city/state pair in Table 1 has an initial MLE weight assigned based on a linear interpolation along one of Lines 1–4 as described below with respect to FIG. 2.

Figure 2:
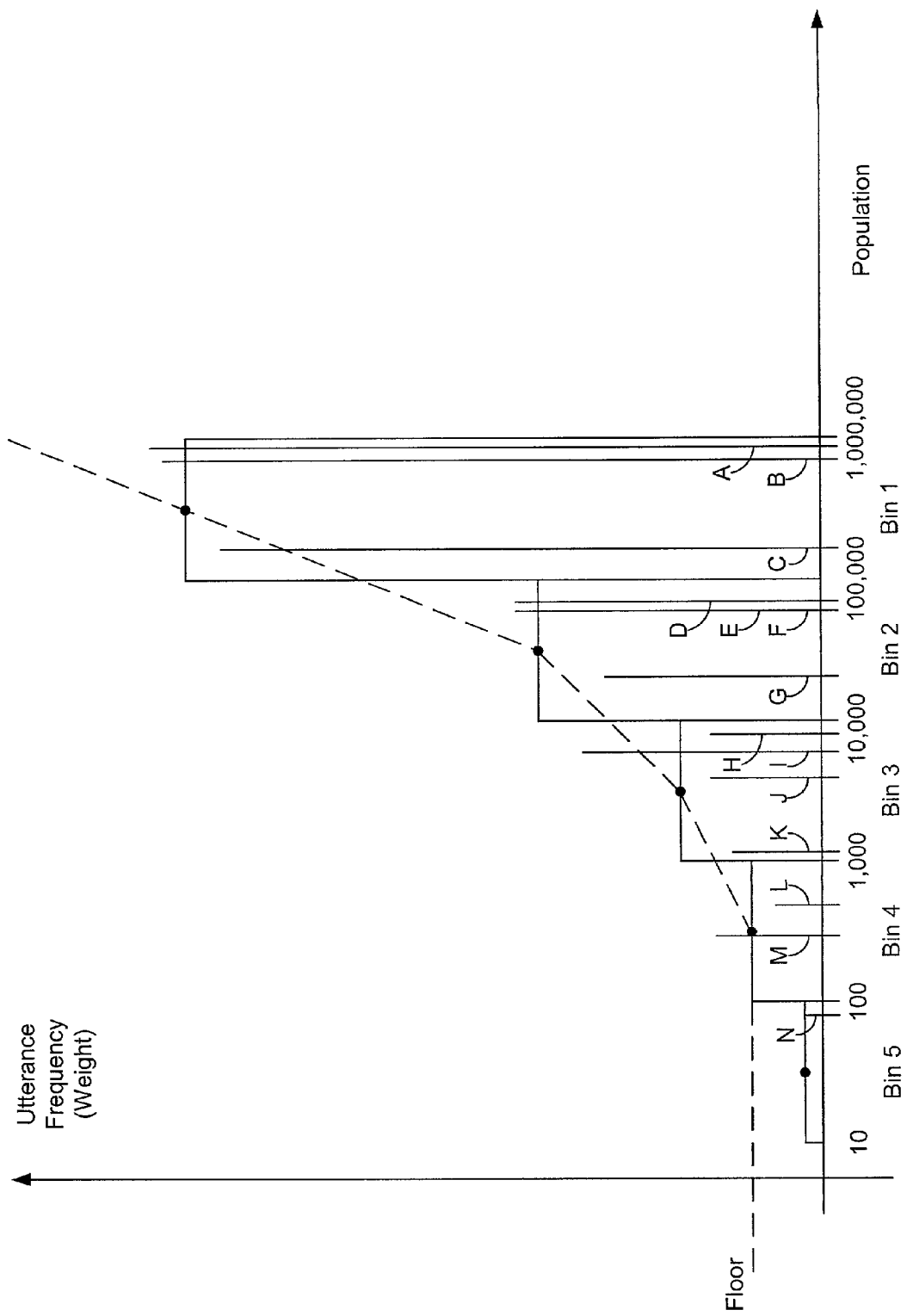
FIG. 2 is a graph of utterance frequency versus population in accordance with the embodiment of FIG. 1.

FIG. 2 is a graph of utterance frequency versus population for the cities of Table 1 in accordance with the embodiment of FIG. 1. Similar to FIG. 1, FIG. 2 includes Bins 1–5. Each of Cities A–N within Bins 1–5 is represented as a plurality of Lines A–N, respectively, according to population. The height of each of Lines A–N corresponds to the actual utterance frequency of that city as calculated using the utterance training set. Note that Cities E and F, having the same population but different actual utterance frequencies, are represented by the same line in FIG. 2.

Table 2 shows another table of Cities A–N to be weighted according this embodiment of the present invention. The actual utterance frequency of each city (i.e. the Number of Utterances divided by the total Number of Utterances) is displayed in the "Actual Utterance Frequency" column.

TABLE 2

| City | Population | Bin | Number of Utterances | Actual Utterance Frequency | Initial MLE Weight | Final MLE Weight |
|---|---|---|---|---|---|---|
| City A | 900,000 | 1 | 18,000 | 36% | .843627 | .843627 |
| City B | 700,000 | 1 | 16,000 | 32% | .655086 | .655086 |
| City C | 170,000 | 1 | 10,000 | 20% | .155450 | .155450 |
| City D | 70,000 | 2 | 1,750 | 3.5% | .061179 | .061179 |
| City E | 60,000 | 2 | 1,750 | 3.5% | .051751 | .051751 |
| City F | 60,000 | 2 | 1,000 | 2% | .051751 | .051751 |
| City G | 20,000 | 2 | 500 | 1% | .016812 | .016812 |
| City H | 8,000 | 3 | 100 | 0.20% | .008358 | .008358 |
| City I | 6,000 | 3 | 720 | 1.44% | .006949 | .014400 |
| City J | 4,000 | 3 | 100 | 0.20% | .005540 | .005540 |
| City K | 1,200 | 3 | 70 | 0.14% | .001607 | .001607 |
| City L | 500 | 4 | 2 | 0.004% | .000414 | .000414 |
| City M | 300 | 4 | 8 | 0.016% | .000100 | .000100 |
| City N | 80 | 5 | 0 | 0% | .000100 | .000100 |

In one embodiment, the initial MLE weight for each city is determined by interpolating the position of the population of that city along the line connecting the midpoint of the bin containing that city with the midpoint of the next closest bin. For example, referring to FIGS. 1 and 2, City D is in Bin 2 and the next closest bin is Bin 1, wherein the midpoints of Bins 1 and 2 are connected by Line 1. Thus, the initial MLE weight is calculated by linearly interpolating between the midpoint of Bin 1 located at population 316,228 with probability 29.33% and the midpoint of Bin 2 located at population 31,623 with probability 2.5% along Line 1. A line of the form:

$$y = mx + b \quad \text{(Equation 1)}$$

has a slope equal to:

$$m = \frac{(y_1 - y_2)}{(x_1 - x_2)} \quad \text{(Equation 2)}$$

and a y intercept equal to:

$$b = \frac{(y_2 x_1 - y_1 x_2)}{(x_1 - x_2)} \quad \text{(Equation 3)}$$

In Equations 1 and 2, x is population and y is utterance frequency. Thus, from Equation 2, Line 1 thus has a slope of $((29.33-2.5)/(316,228-31,623))$ equals $9.4271 \times 10^{-5}$. From Equation 3, Line 1 has a y intercept of $((2.5*316,228-29.33*31,623)/(316,228-31,623))$ equals $-4.8113 \times 10^{-1}$.

The initial MLE weight for City D is determined by calculating the value of Line 1 at a population of 70,000. In other words, to interpolate the initial estimated weight of City D from Line 1, Equation 1 is solved using $m=9.4271 \times 10^{-5}$, $x=70,000$, and $b=-4.8113 \times 10^{-1}$. The resultant initial MLE estimated weight is $((9.4271 \times 10^{-5})*70,000)-4.8113 \times 10^{-1}$) which is equal to 0.061179 (6.1179%). The initial MLE weights for Cities A–C and E–L are calculated similarly. In one embodiment, weights for Cities A and B are calculated using Line 1 because Line 1 connects Bin 1 (the bin containing Cities A and B) and Bin 2 (the next closest bin). In another embodiment, weights may be capped at the level predicted for the midpoint of the highest bin.

A sufficiently small weight on an option effectively prevents that option from being chosen by an ASR system. For this reason, a "floor" is established beyond which weights of options will not be lowered. For this example, 0.01% (the utterance likelihood for each city in Bin 4) is chosen as the floor weight. As a result, all cities having population less than or equal to 316 will have initial MLE weights determined by the floor value rather than along a line between midpoints of bins. For example, City M has a population of 300. Because this is below the population corresponding to the floor weight, the initial MLE weight for City M is assigned as 0.000100 (0.01%). The initial MLE weights for Cities A–N are shown in Table 2.

Potential outliers in FIGS. 1 and 2 have heights above whichever of Lines 1–4 that they cross. As described above, outliers have some minimum number of associated utterances (e.g. 500) and an actual utterance probability greater than some number of multiples (e.g. a multiple of 2) of the initial MLE weight. Other embodiments may have other minimum numbers of associated utterances and other numbers of multiples. The initial MLE weight of outliers is modified to be the actual utterance probability. For example, City I has a height above Line 2, so it is investigated as a potential outlier. City I is an outlier because it has more than the minimum number of associated utterances (720>500) and has an actual utterance frequency (1.44%) greater than twice the initial MLE weight (2*0.6949% is 1.39%). As a result, the initial MLE weight for city I is replaced with the actual utterance frequency of 0.014400 (1.44%) as the final MLE weight.

While City M has a height above Line 4 (the Floor weight), and is therefore a potential outlier, City M is not an outlier because it has fewer than 500 associated utterances (8<500). Thus, the initial MLE weight is not modified, and is therefore used as the final MLE weight. Because Cities A–H, J–L, and N are not outliers, they have initial MLE weights used as the final MLE weights. In one embodiment, option variants can be individually assigned a final MLE weight according to the actual utterance frequency.

Weighting of options according to MLE in accordance with the present invention produces overall improvement in performance as compared to a common system in which the weight of each option is defined directly by the associated statistic divided by the largest statistic associated with an option in the grammar. As a result, accuracy of the ASR system for recognizing an option is improved even when minimal utterance data is available for the option. Increasing the weights of outliers can dramatically improve recognition for options that are more frequently requested than expected from the initial MLE weight, improving performance precisely in those cases which are important to users. Additionally, because modified MLE can be automated, anyone capable of using a user interface of the present method may effectively estimate grammar weights without the need for training as a speech scientist. Further, because modified MLE allows the possibility of segmenting training data by context (such as user demographics, nature of the voice application utilizing the grammar, etc.) and then determining optimal weights for each context, which would be practically impossible using manual analysis.

While modified MLE is typically used to estimate weights of options when few utterances are associated with the options and the options have an easily obtainable statistic that roughly corresponds with the utterance frequency, another method can be used when sufficient utterances are available for some or all of the options in a grammar.

Error Corrective Training (ECT)

Error Corrective Training (ECT) can be used to estimate weights of options when a sufficiently large number of utterances are available. ECT incrementally changes (i.e. "trains") the weight assigned to options in the foreground by minimizing the recognition errors in an utterance training set. The foreground is the set of options being trained, whereas the background is the set of options active for the ASR system during the utterance that are not being trained. An ASR system is in error if the natural language interpretation generated by the ASR system (i.e. the recognized result) is different from the natural language interpretation of the orthographic transcription (i.e. the transcribed result).

An ASR system operates by receiving an audio file (an utterance) and selecting a natural language interpretation for that utterance by choosing an available option in the grammar having the highest score for that utterance. For an ASR system cast in a probabilistic framework, the score for each option is the sum of two numbers in the logarithmic probability domain. The two numbers correspond to the acoustic match (the acoustic score), and the grammar weight. The formulae in this document are based on a probabilistic framework and weights are in the logarithmic domain. The acoustic score for each option is computed by matching the phonetic models corresponding to the phonemes of the options in the active grammars with the acoustic features of an utterance. Because acoustic scores are modeled by the manufacturer of the speech recognizer, the acoustic scores are typically fixed in a particular version of a speech recognizer. However, the weight of an option is defined by an application programmer, and is therefore available for adjustment according to the present invention. As a result, the same utterance applied to an ASR system may result in a different recognized result for a grammar having a first set of weights of options and the same grammar having a second set of weights of options. Thus, minimizing the errors by ECT is accomplished by altering (tuning) the weights of options in the grammar to converge on a solution.

Each utterance is determined to be either correctly recognized or an error based on a comparison of the score of the transcribed result and the best score of another option in the active grammar (the "best competitor"). Specifically, the ASR system generates an "n-best" list in response to an utterance. This n-best list contains all options in the active grammars and their associated scores. The highest scoring option is chosen by the ASR system as the natural language interpretation of the utterance (the recognized result). If the recognized result by the ASR system matches the transcribed result, then the correct translation of the utterance had the highest score on the n-best list. However, if the translation of the utterance by the ASR system does not match the transcribed result, then an option other than the transcribed result had the highest score. Thus, subtracting the score of the highest scoring option other than the transcribed result from the score of the transcribed result yields a negative number for an error and a positive number when no error has occurred.

For example, an utterance causes the ASR system to produce an n-best list including the following five options with associated scores (movies: 10, sports: 8, blackjack: 5, restaurants: 2, and taxi: 1). If the transcribed result of that utterance is "movies", then the best competitor is "sports" with a score of 8. Because the score of "movies", i.e. 10, less the score of "sports", i.e. 8, is a positive number, no error has occurred. However, if the transcribed result of that utterance is "taxi", then the best competitor is "movies" with a score of 10. Because the score of "taxi", i.e. 1, less the score of "movies", i.e. 10, is a negative number, an error has occurred.

The weight of the transcribed result option is adjusted upwards (increased in weight) and the weight of the best competitor is adjusted downwards (decreased in weight) if the best competitor is in the foreground. As a result, the next time the speech recognizer receives that utterance file, the greater weight of the transcribed result makes it more likely to be chosen as the recognized result for that utterance.

ECT is iterated a first time on all of the utterances in the training set using a first set of gains. That is, an error results in a transcribed result weight being adjusted upwards by a first upward delta weight and a best competitor weight potentially being adjusted downward by a first downward delta weight. ECT is then iterated a second time on all of the utterances in the training set using a second set of gains, wherein the second set of gains is smaller than the first set of gains. In this way, each iteration of ECT results uses a progressively smaller set of changes to the weights of the options. Thus, ECT converges on a set of weights of options for the foreground grammar options that minimizes the errors in the utterance training set. This process will be explained in more detail below.

The total error measure for an utterance training set is described by the following discrete equation:

$$E = \Sigma w_1 n_{type1} + w_2 n_{type2} + \quad \text{(Equation 4)}$$

where E is the error measure, w is the weight of the ith transcribed result option and n is the number of errors of the ith type. It is preferable to approximate Equation 4 with a continuous function so that the derivative may be set equal to zero as a minimization technique. Because the error measure of Equation 4 is a step function, it may be approximated by a sigmoid function. As a result, the error function is approximated by the following continuous equation:

$$\hat{E} = \sum w_1 \sigma\left(\frac{\text{error}_1}{\text{scale}}\right) + w_2 \sigma\left(\frac{\text{error}_2}{\text{scale}}\right) + \ldots \quad \text{(Equation 5)}$$

where $\hat{E}$ is the estimated error measure, w is the weight of the ith transcribed result option, $\sigma$ is the sigmoid function, error is the score of the ith correct option (the transcribed result) less the score of the ith best competitor option, and scale is a parameter of the sigmoid function controlling the steepness of the transition from negative to positive on the x axis. Setting the derivative of the estimated error measure equal to zero and solving for error produces a minimum estimated error measure. As the ECT method approaches a solution, the scale of the sigmoid function decreases. That is, in converging on a solution, decreasing the scale of the sigmoid function causes the rate of change of the sigmoid function to increase near the origin, thereby approximating a step function. An implementation of this process is described in more detail below.

A given utterance training set includes both utterances that are correctly recognized by the ASR system and erroneously recognized utterances (errors). Errors may be due to an out-of-grammar utterance by the speaker, a false recognition of the utterance by the speech recognizer, or if rejection is modeled, an erroneous rejection. The amount by which the weight of an option is adjusted (the gain) may differ according to the severity of the associated error. For example, characterizing an out-of-grammar utterance by the speaker to be a minor error may result in a small gain used for out-of-grammar errors. In contrast, characterizing a false recognition of the utterance by the ASR system to be severe may result in a larger gain used for false recognition errors.

Once the severity of the types of errors has been determined, an initial set of gains is defined for a first iteration of ECT. For example, a first set of gains may be defined as 0.3 for all errors. In one embodiment, the grammar weight of the transcribed result is increased by an amount equal to the gain multiplied by the derivative of the sigmoid function evaluated at the score of transcribed result less the score of best competitor quantity divided by the scale as shown in Equation 6.

$$newweight = oldweight + gain \times \sigma'\left(\frac{score_c - score_{b\_c}}{scale}\right) \quad \text{(Equation 6)}$$

The grammar weight of the best competitor is penalized in a similar fashion, as shown in Equation 7.

$$newweight = oldweight - gain \times \sigma'\left(\frac{score_c - score_{b\_c}}{scale}\right) \quad \text{(Equation 7)}$$

wherein $score_c$ is the score of the transcribed result and $score_{b\_c}$ is the score of the best competitor.

Figure 3:
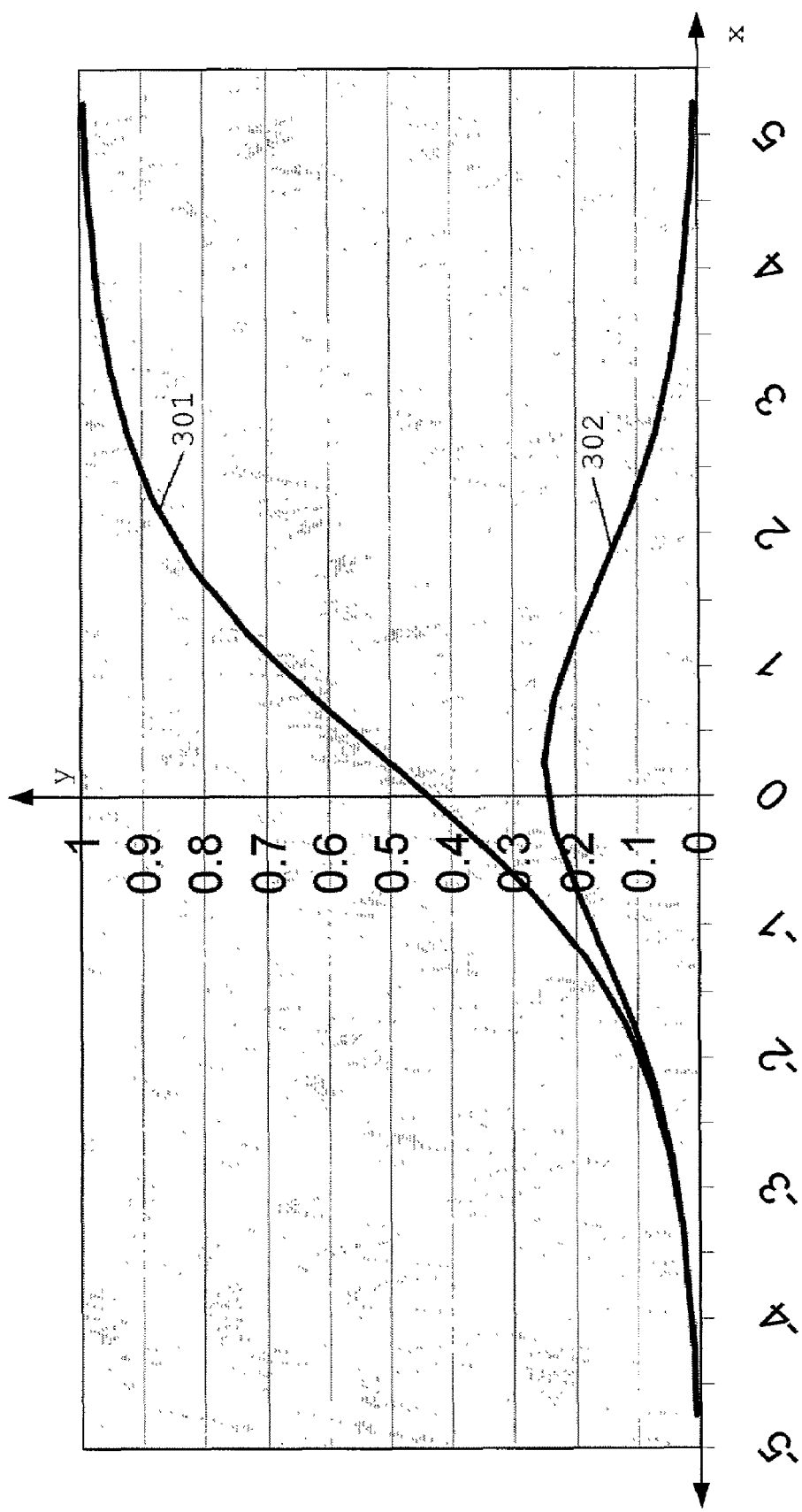
FIG. 3 is a plot of a sigmoid function and the associated derivative in accordance with an embodiment of the present invention.

FIG. 3 is a plot of a sigmoid function and the associated derivative according to an embodiment of the present invention. Line 301 is the graph of a sigmoid function. Note that sigmoid function line 301 has a small value at large negative numbers and gradually approaches a value of 1 at large positive numbers. As the scale described above decreases, the steepness of sigmoid function line 301 increases, thereby more closely approximating a step function.

Line 302 is a graph of a sigmoid derivative. Note that sigmoid derivative has a small value at large negative and positive numbers and a local maximum at the origin. Because Equations 6 and 7 modify the gain by the sigmoid derivative, small differences between the recognized result and the best competitor (i.e. near the center of the sigmoid derivative) are more greatly modified than large differences (i.e. near the edges of the sigmoid derivative). For example, an error of −0.5 will result in a greater up-weighting of the transcribed result than an error of −5, because the value of sigmoid derivative line 302 evaluated at −0.5 is much greater than the value of sigmoid derivative line 302 evaluated at −5. As a result, errors which may be corrected (i.e. small errors that may be corrected by re-weighting) and correctly recognized results that are close in score to the best competitor result in larger changes in weights than errors which are unlikely to be corrected (i.e. large errors) or large differences between the correctly recognized results and the best competitors.

A first iteration of ECT applies each utterance in the utterance training set to the ASR system. For each utterance, the ASR system returns an n-best list of options and associated scores. The score of the option corresponding to the transcribed result is chosen as $score1_c$. The highest scoring incorrect option is chosen as the best competitor with the associated $score1_{b\_c}$ score. If $score1_{b\_c}$ is less than $score1_c$, then there is no error. However, if $score1_c$ is less than $score1_{b\_c}$, then there is an error. If in the foreground, weights of the transcribed result and of the best competitor are adjusted by the first iteration gain formula. For example, the weight of the transcribed result may be increased by 0.3 to 1.3 and the weight of the best competitor may be decreased by 0.3 to 0.7. This process continues for each utterance in the utterance training set.

A second iteration of ECT applies each utterance in the utterance training set to the ASR system. However, the second iteration of ECT differs from the first iteration in the weights of the foreground options (adjusted in the first iteration), the magnitude of the gains (the second set of gains is less than the first set of gains), and the magnitude of the scale (which is less than the scale in the first iteration). For each utterance, the ASR system returns an n-best list of options and associated scores. Note that these scores will be different than the scores returned in the first iteration because the weights of the options in the foreground grammar have been altered. The score of the option corresponding to the transcribed result is chosen as $score2_c$. The highest scoring incorrect option is chosen as the best competitor with a $score2_{b\_c}$ associated score. If $score2_{b\_c}$ is less than $score2_c$, then there is no error. However, if $score2_c$ is less than $score2_{b\_c}$, then there is an error. If the foreground, weights of the transcribed result and of the best competitor are adjusted by the second iteration gain formula. For example, the weight of the transcribed result may be increased by 0.15 and the weight of the best competitor may be decreased by 0.15. This process continues for each utterance in the utterance training set.

Iterations of ECT continue until converging on a solution. Once the solution is obtained, the weights of the options of the foreground grammar are assigned according to this solution. In one embodiment, option variants are also tuned as described above when sufficient utterance data is present. For option variants having insufficient utterance data, the associated options are tuned.

Tuning grammar weights by ECT beneficially tunes weights of options using a large utterance training set without requiring a speech scientist. Note that it is doubtful that even a trained speech scientist could accurately consider all the interrelatedness of a large foreground grammar when attempting to tune. Additionally, automating the tuning process eliminates the dependence on the limited number of speech scientists available. As a result, an application author using a particular grammar need not know anything about the tuning process to use the automated method. An application author may merely access a tool according to the present invention to provide correctly tuned grammar weights for use. Further, by automating the ECT process, it is possible to train different weights for different conditions, for example, time of day or phone call origination, for applications with time sensitive and location sensitive data, respectively.

Figure 4A:
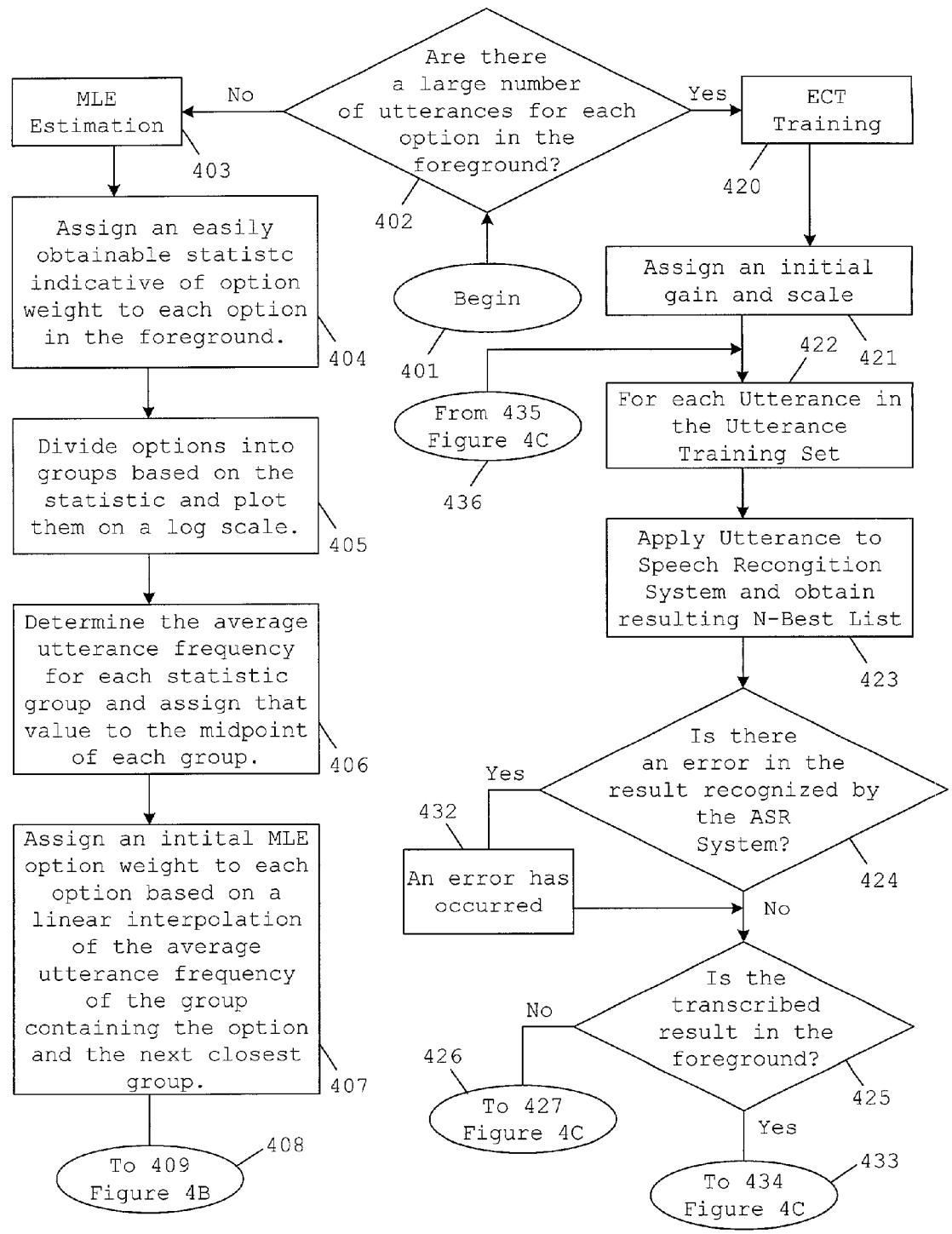
FIG. 4 contains FIGS. 4A–4C, and is a flow diagram of a method of assigning and tuning grammar weights of options in accordance with one embodiment of the present invention.
Figure 4B:
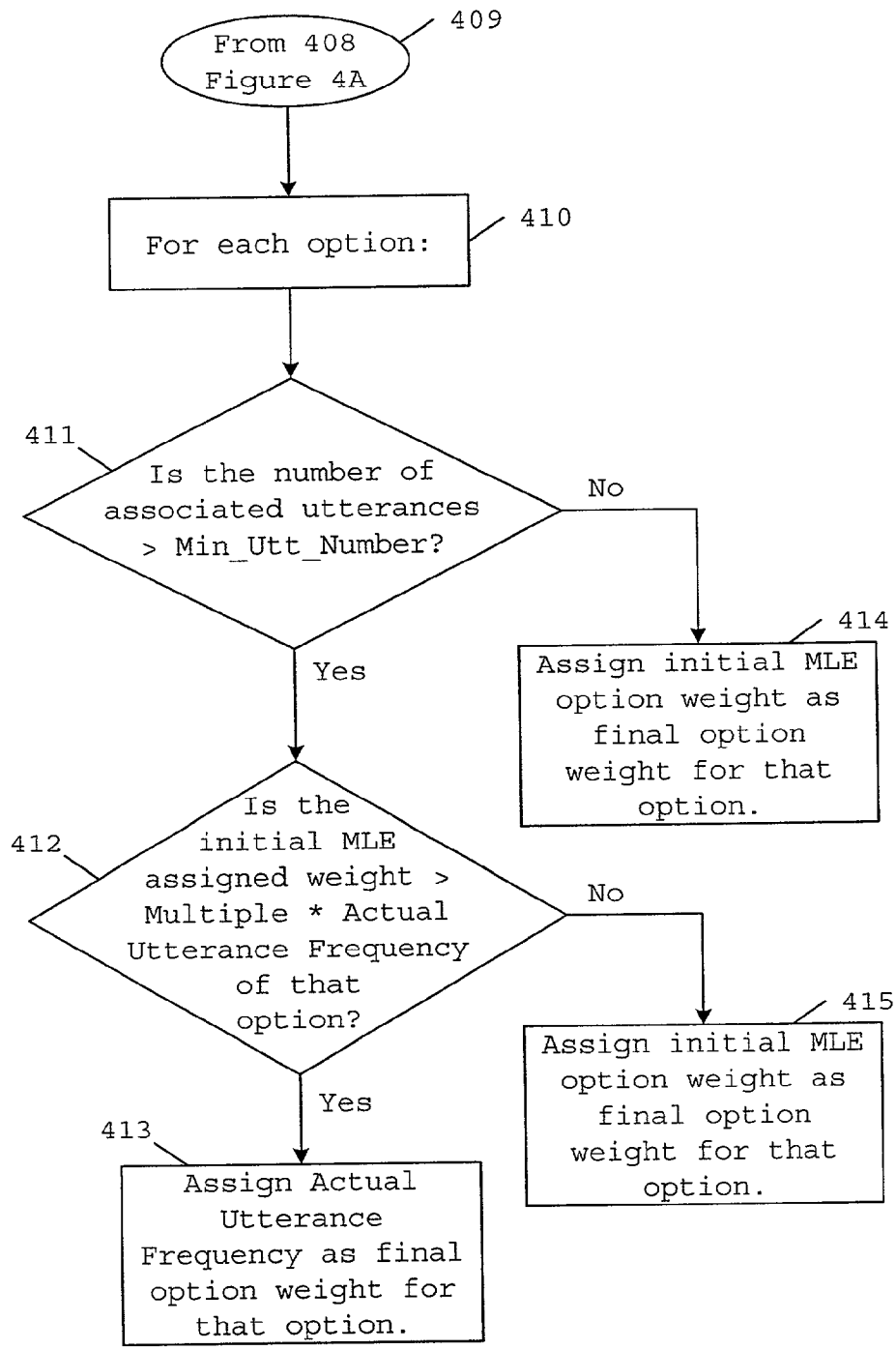
Figure 4C:
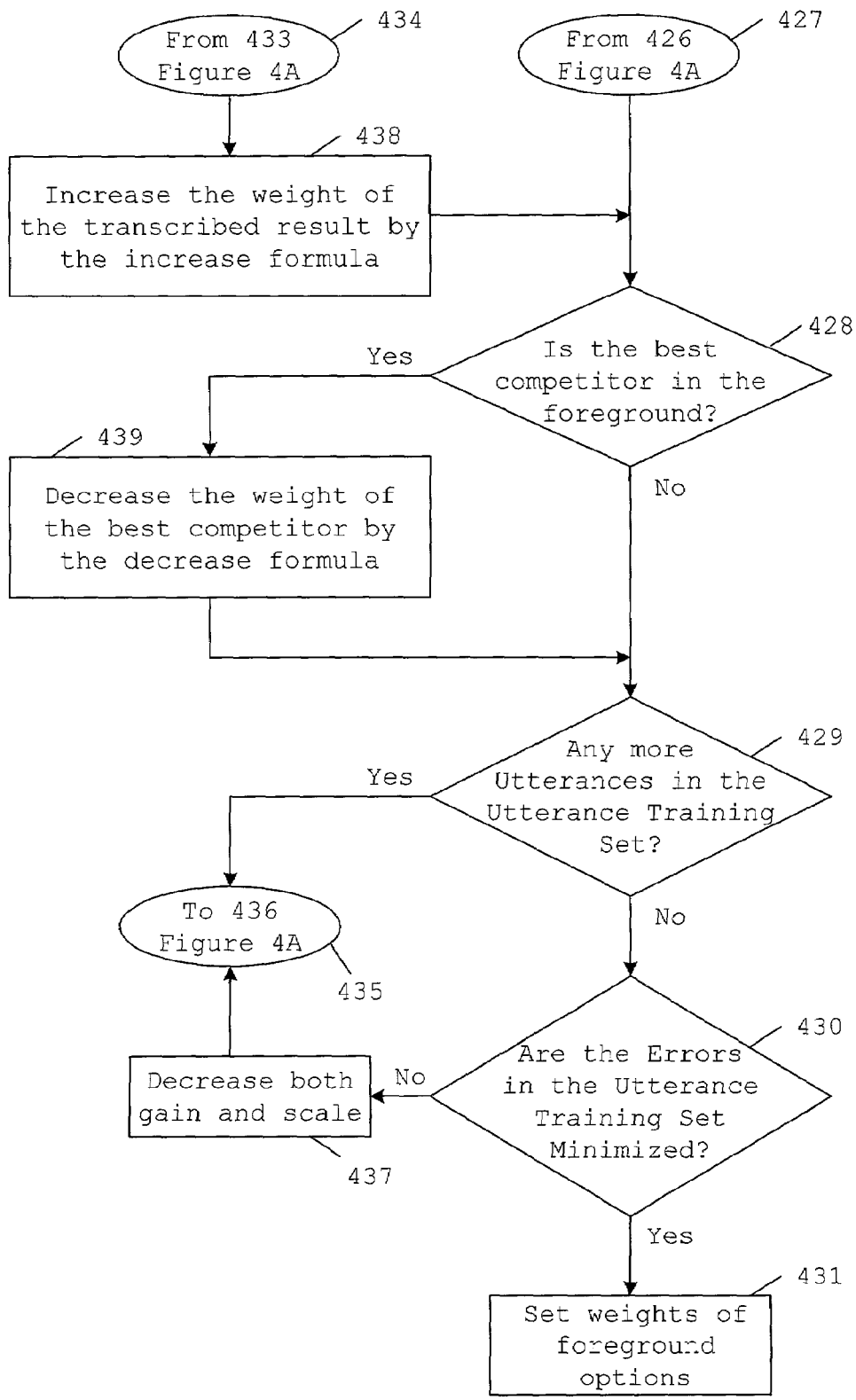

FIG. 4, consisting of FIGS. 4A–4C, is a flow diagram of the estimation and tuning process according to one embodiment of the present invention. The method begins in FIG. 4A at step 401 with a choice in step 402 based on the number of utterance available for each option to be tuned. Note that the MLE branch of step 403 can be taken even when there are large numbers of utterances for each option.

As described above, MLE first assigns a statistic indicative of option weight in step 404, divides the options into groups based on this statistic in step 405, determines the average utterance frequency of each group in step 406, and assigns an initial MLE option weight to each option in step 407. While the method of FIG. 4 shows option weights assigned according to a linear interpolation of group average utterance frequency, other embodiments may assign option weights according to other methods. Step 408 (FIG. 4A) and step 409 (FIG. 4B) show the connection point of the MLE branch between these two Figures.

Once the initial option weights have been assigned in step 407, each option is checked for outlier status in steps 410 and below. Thus, for each option (step 410), if the minimum number of utterances for that option is more than some parameter Min_Utt_Number (step 411) and the initial MLE weight assigned to that option is greater than some multiple (e.g. 2.5) of the actual utterance frequency for that option (step 412), then the option is an outlier and the initial MLE weight will be replaced with the actual utterance frequency (step 413). If too few utterances are associated with the option (step 411) or the utterance frequency is less than a multiple of the initial MLE weight, then the initial MLE weight assigned to the option is made final. Therefore, once one of steps 413–415 has been reached for each option, then MLE weights have been assigned and the method is complete.

As described above, ECT first assigns a gain and scale for the first iteration in step 421. Once a gain and scale have been set, each utterance is applied to the ASR system and an n-best list obtained in step 423. From the n-best list and the transcribed result of the utterance, scores are used to determine if an error occurred in the ASR system in steps 424 and 432. If the transcribed result is in the foreground, then the weight of the transcribed result is increased by a first amount in step 438 (FIG. 4C). Different embodiments use different methods for increasing the weight in step 438, as described above. Step 433 (FIG. 4A) and step 434 (FIG. 4C) show a connection point of ECT branch between FIGS. 4A and 4C. Note that if the transcribed result is not in the foreground, then the weight is not adjusted. Step 426 (FIG. 4A) and step 427 (FIG. 4C) show a connection point of ECT branch between FIGS. 4A and 4C.

If the best competitor is in the foreground (step 428), the associated weight is decreased by a second amount in step 439. Otherwise, the incorrectly recognized result is in the background, and thus is not tuned. The next utterance in the training set is examined in step 429. If more utterances are present, step 435 (FIG. 4C) and step 436 (FIG. 4A) provide the connection point between FIGS. 4A and 4C of ECT for iteration through steps 422–428, 433, 434, 438, and 439. Similarly, if no more utterances are present but the errors in the utterance training set are not yet minimized (step 430), then the gain and scale are decreased in step 437 and steps 435 and 436 provide the connection point between FIGS. 4A and 4C for passing through the utterance training set again. Lastly, if the errors are minimized in step 430, then the weights of the foreground options are set and the method completed in step 431.

Some speech recognizers do not provide acoustic scoring information for competing options. When acoustic scores are unavailable, they may be determined by the following method. First, the active grammar is flattened. For example, Table 3 is an example of an active grammar.

TABLE 3

| Option | Grammar Specification (Nuance (™) GSL Format) |
|---|---|
| sports | (?TELLME [sports]) |
| taxi | (?TELLME [taxi (taxicab)]) |
| movies | (?TELLME [movies (movie)]) |

This active grammar has three natural language options—sports, taxi, and movies. For each option, there are different option variants defined. The "?" before the word "TELLME" indicates that a permutation of the sub-grammar "TELLME" which may or may not precede any of the following phonemes. The TELLME sub-grammar includes uttering two words "tell me" (where distinct words are indicated by the space between the two words) as well as slurring together two words as "tell_me" (where the slurring is indicated by the underscore), and "tellme" (where the phrase is spoken as a single word). Specifically, the option "sports" will be chosen when the ASR system determines that an utterance is one of the following option variants: "sports", "tellme sports", "tell me sports", or "tell_me sports". However, "sport" will not cause the ASR system to choose the "sports" option (unless the ASR falsely accepts an utterance of "sport" as one of the valid grammar options) because "sport" is not in the list of option variants for the option "sport".

A grammar specification is flattened to the individual grammar options (i.e. forcing grammars) by explicitly expanding all option variants for an option, listing each grammar option separately. Table 4 is a flattened active grammar according to the embodiment of Table 3.

TABLE 4

| Flattened Grammar Options | | |
|---|---|---|
| sports option | taxi option | movies option |
| sports | taxi | movies |
| tellme sports | tellme taxi | tellme movies |
| tell me sports | tell me taxi | tell me movies |
| tell_me sports | tell_me taxi | tell_me movies |
|  | taxicab | Movie |
|  | tellme taxicab | tellme movie |
|  | tell me taxicab | tell me movie |
|  | tell_me taxicab | tell_me movie |

Note that each option has all possible option variants enumerated. The flattened grammars of Table 4 are shown separated into separate grammars (option-grammars), each option-grammar containing the option variants for one option.

The weights of all option variants for each option-grammar are set to 1 to make each option variant distinct to the ASR system based only on the acoustic score. Each option-grammar is then separately run through the ASR system against the utterances. Thus, the ASR system is forced to compute the recognition score for each option. This list of scores is called an exhaustive n-best list for the active grammars. This exhaustive n-best list may be used to approximate the untunable portion of the ASR system score.

Tables 5 and 6 are flattened option-grammars for the sports and taxi options, respectively, of Table 4.

TABLE 5

| sports option variants | Utt1 score | Utt2 score | Utt3 score |
|---|---|---|---|
| sports | 5 | 3 | 3 |
| tellme sports | 10 | 2 | 5 |
| tell me sports | 7 | 6 | 8 |
| tell_me sports | 4 | 6 | 2 |
| sports | 8 | 5 | 5 |

TABLE 6

| taxi option variants | Utt1 score | Utt2 score | Utt3 score |
| --- | --- | --- | --- |
| taxi | 4 | 2 | 2 |
| tellme taxi | 5 | 1 | 5 |
| tell me taxi | 2 | 2 | 2 |
| tell_me taxi | 3 | 3 | 6 |
| taxicab | 3 | 3 | 4 |
| tellme taxicab | 1 | 2 | 5 |
| tell me taxicab | 2 | 2 | 5 |
| tell_me taxicab | 9 | 2 | 3 |

Tables 5 and 6 show the results of an ASR system for each option variant within grammar options "sports" and "taxi", respectively, for each of three utterances. For example, applying a first utterance, Utt1, to the speech recognizer results in the scores in the Utt1 column of Table 5. Each option variant receives a score. Because the weights of each option variant are set to 1 (or set to equal amounts), the score shown in the Utt1 column corresponds to the acoustic score, and in the case of the Nuance™ Recognizer is equivalent to the log of the acoustic score. The option variant having the highest score is stored as the acoustic score for the associated option with respect to utterance Utt1. For example, because the highest score for the "sports" option is 10, which is associated with the "tellme sports" option variant, the score 10 is saved and associated with the sports option for the remainder of this tuning iteration. Thus, when the ECT method uses a score for the transcribed result and the best competitor, that score may be determined from the weights of the options and the scores associated with the natural language interpretation and the best competitor.

Note that if a first option variant is uttered (e.g. "tellme movies") but the speech recognizer recognizes a second option variant (e.g. "movies"), but both option variants are associated with the same option, an error has not occurred for purposes of the ECT process. In one embodiment, weights can be trained for different option variants of the same grammar option by updating only a weight for the option variant of the recognized grammar option (as opposed to updating the weight of the grammar option as a whole) as well as updating the weight of the transcribed result. This embodiment is most effective in conjunction with large utterance training sets. In a variation of this embodiment, a separate weight can be trained for alternative pronunciations of each option variant.

The first utterance is applied to the ASR system and associated scores are accessed. The score of the option that matches the human transcribed utterance (correct score) and the highest scoring incorrect option (best competitor score) are noted. For example, if Utterance1 is transcribed as "sports", then the correct score is 10 (associated with the option variant "tellme sports" in Table 5) and the best competitor score is 9 associated with the "taxi" option (from the "tell_me taxicab" option variant in Table 6), thereby indicating that the highest scoring option, "sports", was correctly chosen by the ASR system. However, if Utterance1 is transcribed as "taxi", then the correct score is 9 and the best competitor score is 10 associated with the "sports" option ("tellme sports" option variant in Table 5), thereby indicating that the highest scoring option, "sports", was incorrectly chosen by the ASR system.

Additional Embodiments

In one embodiment, a Zero-Footprint Remotely hosted development environment, see, e.g., U.S. patent application Ser. No. 09/592,241-5696, entitled "Method and Apparatus for Zero-Footprint Application Development", having inventors Jeff C. Kunins, et. al., and filed 13 Jun. 2000, is extended to allow developers (e.g. application authors) to make use of the MLE and ECT approaches for the training of grammars.

Application of the two approaches requires slightly different tools. The ECT approach requires a significant number of utterances. In contrast, the MLE approach focuses on identifying a statistic to assist in setting weights. If statistics are to be presented for MLE training, they can be presented in an XML (or other standard) format that associates the relevant statistic with the grammar option. Using hypertext transfer protocol (HTTP) form submission (or other forms of data transfer) the remote development environment could accept the statistics and perform MLE training of a grammar.

As a starting point, in one embodiment, developers are provided access to utterances from presently operational instances of their applications. This is preferably done by allowing them access to a web-based transcription tool, see, e.g., U.S. patent application Ser. No. 09/747,026, entitled "Transcription and Reporting System", having inventors Barry M. Arons, et. al., and filed 20 Dec. 2000. Alternatively, the developer may request (and pay for) transcription of a number of utterances through the web based development interface.

In one embodiment, after a sufficient number of transcribed utterances (as estimated by the total number of utterances and the size of the grammar) have been accumulated, the developer is alerted (e.g. email, icon in development interface, phone call notification, etc.) that a particular grammar is ready for automatic tuning.

In one embodiment, the ECT approach is attempted automatically after such an alert (as described above). In other embodiments, the developer must explicitly request ECT (and pay if required) through the development interface. In one embodiment, developers are charged differing fees depending on whether a speech specialist reviews the results of the ECT approach.

In another embodiment, grammars can be tuned at no charge; however, to view (and further tune) the grammar weights, a fee must be paid. In another embodiment, prior to grammar tuning, the developer must agree that tuned grammars can only be used in conjunction with a system licensed for ECT. This may be an important contractual obligation to protect the competitive advantages offered by an ECT trained-grammar to voice application environments that do not provide similar features.

In yet another embodiment, the training methods are exposed for purchase as part of a customer extranet (or other customer access network.) This configuration is similar to the developer configuration, except it is more focused on the "lay" purchaser of voice applications. In this configuration, the extranet which is providing usage statistics and billing for a hosted voice application may also provide some error and accuracy information (e.g. from transcription of a meaningful amount of utterance data for a particular application or suite of applications).

This transcription data may have been produced at no direct charge to the application "owner" (e.g. the person who is paying to host the application), or it may have been a paid transcription effort. In either case, for grammars that are underperforming as shown in the extranet web pages, one or more "buy it" links may be present to allow the application owner to purchase grammar training such as ECT or more complete packages.

Other web enabled features may include grammar performance visualization tools (either extranet or developer focused) that compare the performance of re-running an existing batch of utterances through the speech recognizer with a re-weighted grammar. In one embodiment, the visualization is a graph comparing performance of the old and new grammars with different rejection thresholds. This graph can help customers appreciate the value of their purchase (e.g. of the tuning process) since they can see that the tuned grammar (hopefully) has a better performance than the old (untuned) grammar.

Further, for developers the graphs may help in setting the reject (or confirmation) threshold in their application program code. Those thresholds are another factor that, for example in VoiceXML, are settable on a per-field (e.g. voice input basis) to control how "certain" the ASR must be of the top choice in order to select it. For example if the threshold is 80, but the highest option is only 70 a <nomatch/> would result. Thus, the graphs offer another opportunity to tune speech recognition performance at the application level.

Conclusion

The embodiments described above are illustrative only and not limiting. For example, other methods to calculate the change in weights may be used for the ECT method. Additionally, other methods, such as normalization of the statistic for modified MLE, may be included in the present method. Other embodiments and modifications to the system and method of the present invention will be apparent to those skilled in the art. Therefore, the present invention is limited only by the appended claims.

What is claimed is:

1. A method of determining weight for a grammar option in a speech recognition grammar, the method comprising:
associating a statistic with each grammar option that approximates a first probability of uttering that grammar option;
dividing the grammar options into groups based on the statistic;
determining for each group a second probability of uttering any grammar option within that group; and
determining an average probability of uttering one grammar option in each group.

2. The method of claim 1, further comprising estimating the weight of each grammar option in a group based on an interpolation between the second probability of a group including the grammar option and the second probability of a next closest group.

3. The method of claim 2, further comprising replacing the estimated weight for a first grammar option with an actual probability based on a number of utterances associated with the first grammar option divided by a total number of utterances in an utterance training set of grammar options.

4. The method of claim 3, wherein the estimated weight is found to be significantly lower than the actual frequency of the grammar option.

5. The method of claim 1, wherein dividing the grammar options into groups is based on a normalized value of the statistic.

6. A method of determining weight for an option variant of a grammar option in a speech recognition grammar, the method comprising:
associating a statistic with each option variant that approximates a first probability of uttering that option variant;
dividing the option variants into groups based on the statistic;
determining for each group a second probability of uttering any option variant within that group; and
determining an average probability of uttering one option variant in each group.

7. The method of claim 6, further comprising estimating the weight of each option variant in a group based on an interpolation between the second probability of a group including the option variant and the second probability of a next closest group.

8. The method of claim 7, further comprising replacing the estimated weight for a first option variant with an actual probability based on a number of utterances associated with the first option variant divided by a total number of utterances in an utterance training set of option variant.

9. The method of claim 8, wherein the estimated weight is found to be significantly lower than the actual frequency of the option variant.

10. The method of claim 6, wherein dividing the option variants into groups is based on a normalized value of the statistic.

11. A method of determining weight for a grammar option in a speech recognition grammar, the method comprising:
determining a correct score and a best competitor score for each utterance in an utterance training set;
comparing the correct score to the best competitor score for each utterance; and
increasing the weight of a first grammar option associated with the correct score by a first amount.

12. The method of claim 11, wherein the method is iterated to converge on a solution for the weight of grammar option in the speech recognition grammar.

13. The method of claim 11, further comprising decreasing a weight of a second grammar option associated with the best competitor score by a second amount.

14. The method of claim 13, wherein the first amount and the second amount decrease in successive iterations.

15. The method of claim 13, wherein the second amount is based on a derivative of a sigmoid function.

16. The method of claim 11, wherein the first amount is based on a derivative of a sigmoid function.

17. A method of determining an acoustic score of grammar options in a speech recognition grammar used by an automatic speech recognition (ASR) system, comprising:
applying the speech recognition grammar to the ASR system to obtain an n-best list containing a score of each grammar option variant associated with each grammar option; and
subtracting a grammar weight from the score of each grammar option variant to get the acoustic score of the grammar option variant.

18. The method of claim 17, wherein the speech recognition grammar applied to the ASR system is a forcing grammar comprising a set of grammar option variants for each grammar option whereby each option variant associated with each grammar option is explicitly specified.

19. A computer readable medium having a software program for determining weight for a grammar option in a speech recognition grammar, the program comprising:
means for associating a statistic with each grammar option that approximates a first probability of uttering that grammar option;
means for dividing the grammar options into groups based on the statistic;
means for determining for each group a second probability of uttering any grammar option within that group; and means for determining an average probability of uttering one grammar option in each group.

20. A computer readable medium having a software program for determining weight for a grammar option in a speech recognition grammar, the program comprising:
means for determining a correct score and a best competitor score for each utterance in an utterance training set;
means for comparing the correct score to the best competitor score for each utterance; and
means for increasing the weight of a first grammar option associated with the correct score by a first amount.

21. A computer readable medium having a software program for determining an acoustic score of grammar options in an automatic speech recognition (ASR) grammar, comprising:
means for flattening the grammar options in the grammar whereby each option variant associated with each grammar option is explicitly specified;
means for separating each option variant associated with a particular grammar option into a forcing grammar associated with that particular grammar option;
means for applying each forcing grammar to an ASR system to obtain an n-best list for that forcing grammar; and
means for storing the highest score from the n-best as the acoustic score of the particular grammar option.

22. A method of determining weight for an option variant of a grammar option in a speech recognition grammar, the method comprising:
determining a correct score and a best competitor score for each utterance in an utterance training set;
comparing the correct score to the best competitor score for each utterance; and
increasing the weight of a first option variant for a grammar option associated with the correct score by a first amount.

23. The method of claim 22, wherein the method is iterated to converge on a solution for the weight of the option variant of the grammar option.

24. The method of claim 22, further comprising decreasing a weight of a grammar option associated with the best competitor score by a second amount.

25. The method of claim 24, wherein the first amount and the second amount decrease in successive iterations.

26. The method of claim 24, wherein the second amount is based on a derivative of a sigmoid function.

27. The method of claim 22, wherein the first amount is based on a derivative of a sigmoid function.

28. The method of claim 22, further comprising decreasing a weight of a second option variant of a grammar option associated with the best competitor score by a second amount.

29. The method of claim 28, wherein the first amount and the second amount decrease in successive iterations.

30. The method of claim 28, wherein the second amount is based on a derivative of a sigmoid function.

31. The method of claim 28, wherein the first amount is based on a derivative of a sigmoid function.

32. A method of determining weight for an alternative pronunciation of an option variant of a grammar option for a speech recognition grammar, the method comprising:
determining a correct score and a best competitor score for each utterance in an utterance training set;
comparing the correct score to the best competitor score for each utterance; and
increasing the weight of a first alternative pronunciation of an option variant associated with the correct score by a first amount.

33. The method of claim 32, wherein the method is iterated to converge on a solution for the weight of the alternative pronunciation of the option variant.

34. The method of claim 32, further comprising decreasing a weight of an alternative pronunciation of a grammar option associated with the best competitor score by a second amount.

35. The method of claim 34, wherein the first amount and the second amount decrease in successive iterations.

36. The method of claim 32, further comprising decreasing a weight of a second option variant of a grammar option associated with the best competitor score by a second amount.

37. A method of supporting development of a phone application grammar for a zero-footprint remotely hosted development environment having a network interface, the method comprising:
receiving over the network interface from a remote computer the phone application grammar;
executing a tuning algorithm on the phone application grammar resulting in a tuned phone application grammar, wherein the tuning algorithm executes without input from a speech specialist; and
presenting the tuned phone application grammar to the remote computer over the network interface.

38. The method of claim 37, wherein the tuning algorithm is a modified maximum likelihood estimation algorithm.

39. The method of claim 37, wherein the tuning algorithm is an error corrective training algorithm.

40. The method of claim 37, wherein the phone application grammar includes pronunciation variants of grammar options.

41. A method of supporting development of a phone application grammar for a zero-footprint extranet hosted application having a network interface, the method comprising:
receiving over the network interface from a remote computer the phone application grammar;
executing a tuning algorithm on the phone application grammar resulting in a tuned phone application grammar, wherein the tuning algorithm executes without input from a speech specialist; and
presenting the tuned phone application grammar to the remote computer over the network interface.

42. The method of claim 41, wherein the tuning algorithm is a modified maximum likelihood estimation (MLE) algorithm.

43. The method of claim 41, wherein the tuning algorithm is an error corrective training (ECT) algorithm.

44. The method of claim 41, wherein the phone application grammar includes pronunciation variants of grammar options.

\* \* \* \* \*